(12) United States Patent  
Frolov

(10) Patent No.: US 8,601,926 B2  
(45) Date of Patent: Dec. 10, 2013

(54) PORTABLE TABLE SAW HAVING A DURABLE SUB-FRAME

(75) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 12/505,719

(22) Filed: Jul. 20, 2009

(65) Prior Publication Data

US 2011/0011231 A1    Jan. 20, 2011

(51) Int. Cl.
*B26D 1/14* (2006.01)
*B26D 1/18* (2006.01)

(52) U.S. Cl.
USPC .................................... 83/471.2; 83/477.2

(58) Field of Classification Search
USPC .......... 83/471.2, 477.2, 438, 473, 477.1, 582, 83/665, 698.31, 698.51, 698.61
See application file for complete search history.

(56) References Cited

U.S. PATENT DOCUMENTS

| | | | |
|---|---|---|---|
| 2,247,314 A | | 6/1941 | Sellmeyer |
| 2,937,672 A | | 5/1960 | Gjerde |
| 3,270,365 A | * | 9/1966 | Waters et al. ................... 15/325 |
| 4,599,927 A | * | 7/1986 | Eccardt et al. .................. 83/473 |
| 4,976,251 A | * | 12/1990 | Smith ......................... 125/13.01 |
| 5,778,953 A | * | 7/1998 | Braddock ................... 144/286.1 |
| 6,360,797 B1 | * | 3/2002 | Brazell et al. .............. 144/286.1 |
| 6,942,229 B2 | * | 9/2005 | Brazell et al. .................... 280/30 |
| 7,077,421 B2 | * | 7/2006 | Wu .................................. 280/645 |
| D636,417 S | * | 4/2011 | Frolov et al. ................. D15/133 |
| 2005/0093258 A1 | * | 5/2005 | Brazell et al. .................... 280/30 |
| 2007/0245869 A1 | | 10/2007 | Welsh et al. |

* cited by examiner

*Primary Examiner* — Ghassem Alie
(74) *Attorney, Agent, or Firm* — Maginot, Moore & Beck

(57) ABSTRACT

Embodiments are disclosed for a table saw including a table top having a generally rectangular top surface with front, rear and opposing side surfaces and having a slot through which a saw blade can extend, a tubular sub-frame for supporting the table saw, the sub-frame having an outer periphery generally coextensive with the outer periphery of the table top, front and rear vertical metal panels having upper and lower transverse mounting portions interconnecting the sub-frame and the table top and left and right vertical side panels made of a composite material mounted on the sub-frame and extending generally between the front and rear metal panels.

6 Claims, 5 Drawing Sheets

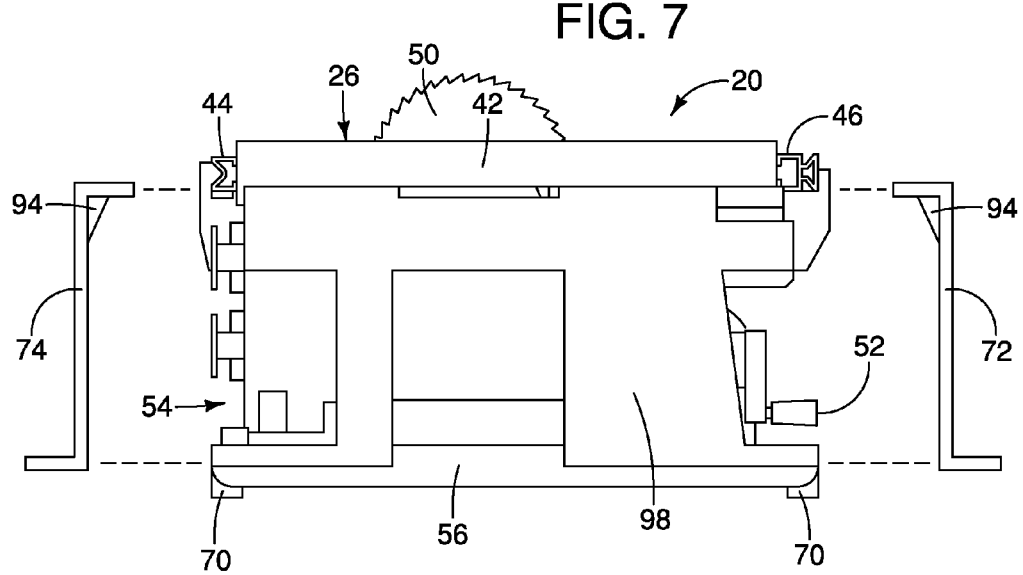
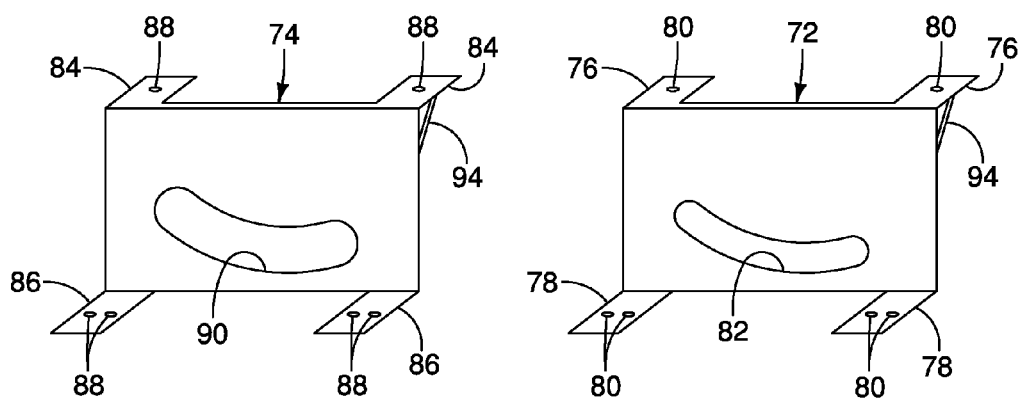

PORTABLE TABLE SAW HAVING A DURABLE SUB-FRAME

BACKGROUND OF THE INVENTION

The present invention generally relates to power table saws.

Construction and remodeling as well as other similar activities require carpenters and artisans to take power tools to a jobsite to work on a job. Because some of the tools are quite valuable, it is necessary to take the power tools to the jobsite on a daily basis. Some of the larger tools, such as table saws, used to cut boards and other materials, are relatively large and bulky. It is desirable that the table saws be designed and constructed to be as lightweight as possible because they have to be either carried or moved by a hand truck or the like from their vehicle to the location on the jobsite where they will be used. The frequent transport of such tools to and from a jobsite often results in the tools being bumped or dropped during transport. It is therefore desirable that the table saw have full functional operability, but be relatively lightweight and have sufficient table surface area to be effective in cutting larger boards. Moreover, it is important that the table saw be designed to withstand the expected nonintentional abuse that occurs during transport and use on a jobsite.

SUMMARY OF THE INVENTION

Embodiments are disclosed for a portable table saw including a table top having a generally rectangular top surface with front, rear and opposing side surfaces and having a slot through which a saw blade can extend, a tubular sub-frame for supporting the table saw, the sub-frame having an outer periphery generally coextensive with the outer periphery of the table top, front and rear vertical metal panels having upper and lower transverse mounting portions interconnecting the sub-frame and the table top and left and right vertical side panels made of a composite material mounted on the sub-frame and extending generally between the front and rear metal panels.

Another embodiment of the present invention discloses a portable table saw including a table top having a generally rectangular top surface with a front, rear and opposing side surfaces and having a slot through which a saw blade can extend, a tubular sub-frame for supporting the table saw, the sub-frame having an outer periphery generally coextensive with the outer periphery of the table top, a handle connected to the sub-frame, the handle extending transversely from the sub-frame and positioned at a center of gravity of the table saw for providing weight balance when carrying the table saw, front and rear vertical metal panels having upper and lower transverse mounting portions interconnecting the sub-frame and the table top and left and right vertical side panels made of a composite material mounted on the sub-frame and extending generally between the front and rear metal panels.

DESCRIPTION OF THE DRAWINGS

FIG. 7 is an exploded left side view of the embodiment of the portable table saw shown in FIG. 6, illustrating the front and rear metal panels removed from the table saw;

FIG. 8 is a perspective view of the front and rear metal panels shown in FIG. 7.

DETAILED DESCRIPTION

Figure 1:
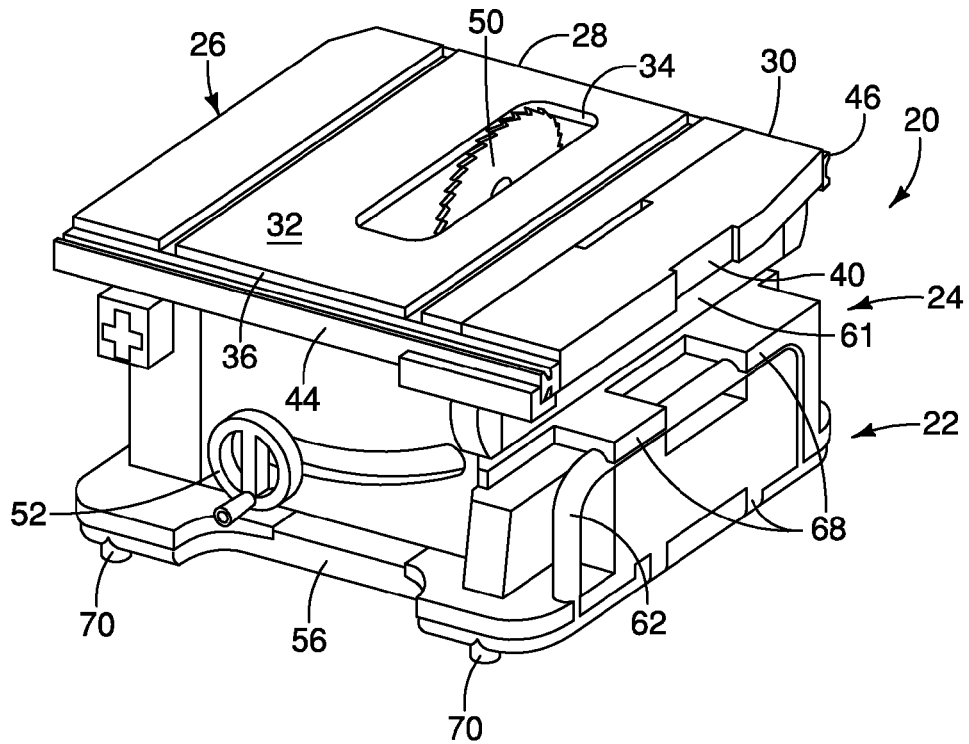
FIG. 1 is a front perspective view of a portable table saw and a sub-frame attached to a bottom of the table saw in accordance with an embodiment of the present invention.
Figure 2:
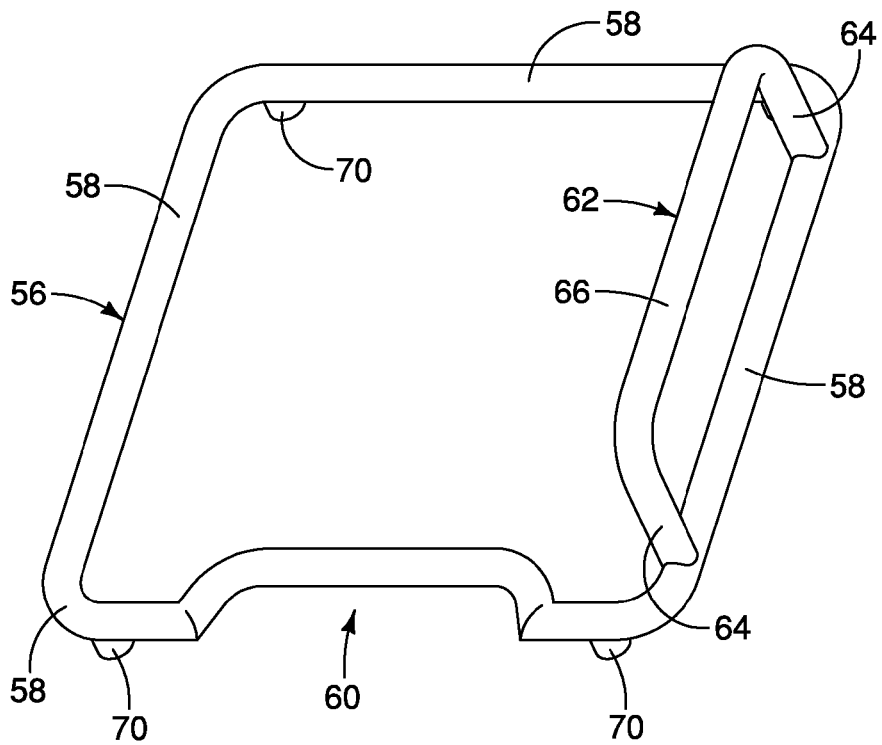
FIG. 2 is a perspective view of a preferred embodiment of the sub-frame illustrated in FIG. 1.
Figure 3:
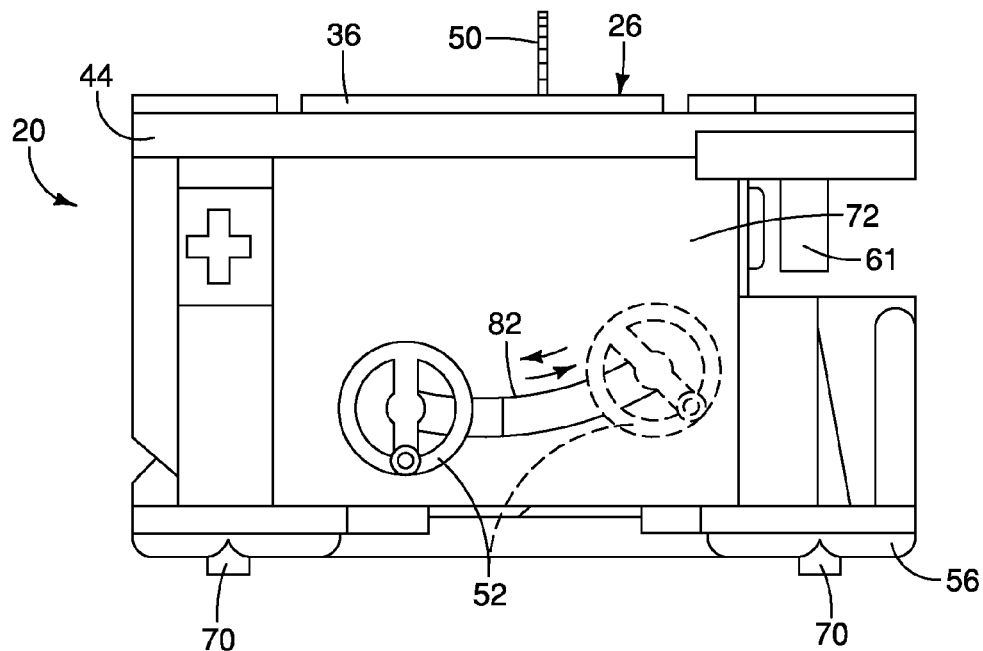
FIG. 3 is a front view of the portable table saw shown in FIG. 1.
Figure 4:
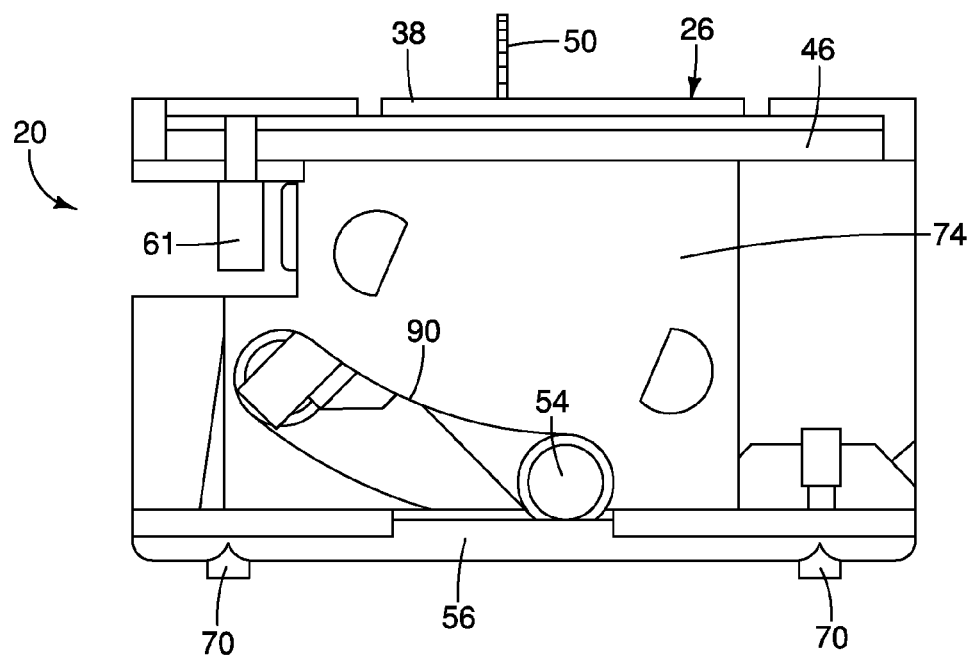
FIG. 4 is a rear view of the portable table saw shown in FIG. 1.
Figure 5:
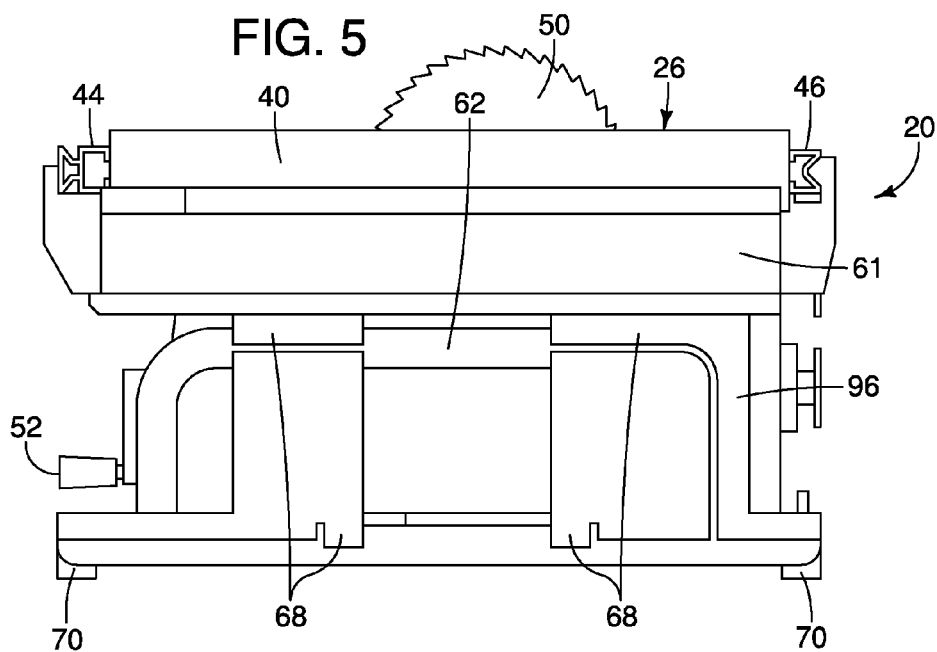
FIG. 5 is a right side view of the portable table saw shown in FIG. 1.
Figure 6:
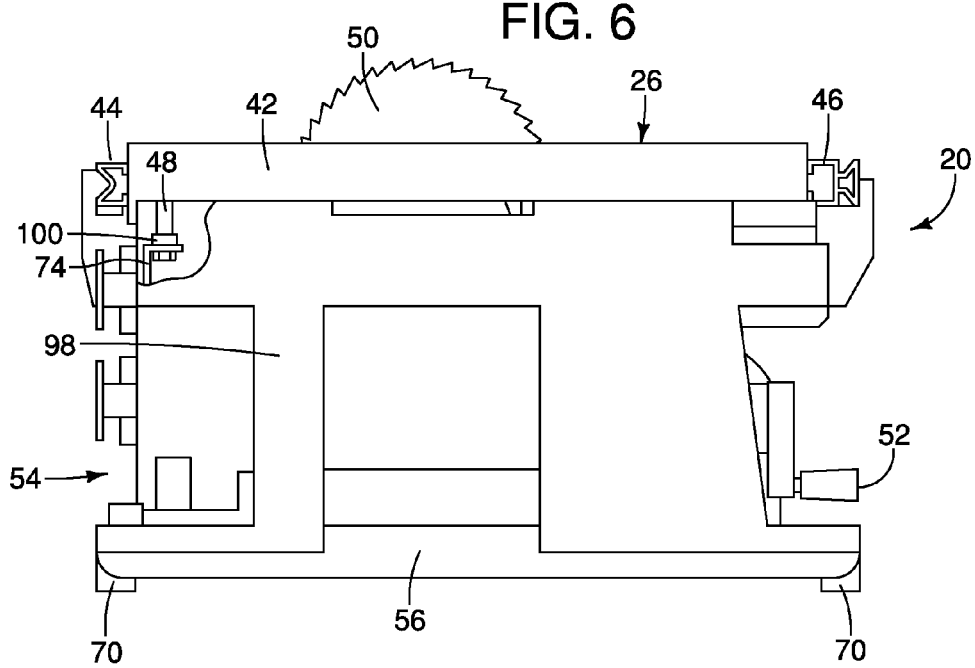
FIG. 6 is a left side view of the portable table saw shown in FIG. 1, where a portion of the left side panel is cut away to show the connection of the rear side panel to one of the bosses extending from the table top.

Embodiments of the present invention are shown in the drawings, with a first preferred embodiment being shown in FIGS. 1-9 wherein a power table saw, indicated generally at 20, is illustrated and has a base 22, a frame 24 and a table top 26. The table top 26 has a main section 28 and an extension section 30. The main section 28 includes a generally rectangular top surface 32 defining a slot 34 and a front surface 36, a rear surface 38 and opposing side surfaces 40, 42 and front and rear symmetrical rails 44, 46. Cylindrical bosses 48 defining threaded holes extend downwardly from the table top 26 for connecting the table top to side panels forming the frame 24 of the table saw as discussed below. The extension section 30 is attached to the front and rear rails 44, 46 and includes a rip fence 61 (shown in the storage position) that slides toward and away from the main section 28 along the front and rear rails 44, 46 to accommodate larger pieces of material as disclosed in U.S. patent application Ser. No. 12/431,044, which is incorporated herein by reference in its entirety. A blade 50 at least partially extends through the slot 34 for cutting material such as wood. A blade adjustment control 52 is rotatably mounted to the front side of the table saw and adjusts the bevel and height of the blade. As shown in FIG. 3, the blade adjustment control 52 is movable between a first position, which sets the saw blade 50 at a 90 degree angle relative to the table top 26, and a second position which sets the blade at a 45 degree angle relative to the table top. The rear side of the table saw includes an exhaust vent 54 that discharges saw dust generated by cutting.

These general components are typical of such portable table saws that can be easily transported to a jobsite where they are used in conjunction with construction, remodeling and similar projects. While it is important that the table saws be relatively lightweight so that a craftsman can carry them from their vehicles to the location where they will be used on a jobsite without difficulty, it is also important that they be designed and constructed so that they can withstand the inevitable wear and tear that they are subjected to at a construction or similar jobsite.

To help protect the table saw 20 from wear and tear, the table saw includes a durable sub-frame 56. The sub-frame 56 has a tubular structure with an outer periphery that is generally coextensive with the outer periphery of the table top 26. The tubular structure of the sub-frame 56 is formed by a plurality of hollow, straight tubes 58 that are integrally connected together by welding, fasteners or other suitable processes. The corners of the tubes 58 are curved or rounded so that the corners do not catch on a user's clothing or other material, or cause injury if bumped into during transport. It is contemplated that the tubes 58 may be round, square, oval, rectangular or any suitable shape or combination of shapes. Further, the sub-frame 56 may be formed to have a C-shape, U-shape, W-shape, D-shape or any suitable shape or shapes. In a preferred embodiment, the sub-frame 56 is formed by two C-shaped portions connected together by welding or other suitable attachment method. It is contemplated that any suitable combination of the tubes may be joined together to form the sub-frame. The sub-frame 56 also has a reduced or shortened height profile to reduce the overall height of the table saw 20 and allow for sufficient clearance.

As shown in FIGS. 1 and 2, the sub-frame 56 has a recessed portion 60 to allow clearance for a user's hand when operating the blade adjustment control 52. The recessed portion 56 allows a user to have full range of motion when rotating the adjustment controls 52 and also helps to prevent injury to the user's hand resulting from scraping or bumping their hand on the sub-frame.

Figure 9:
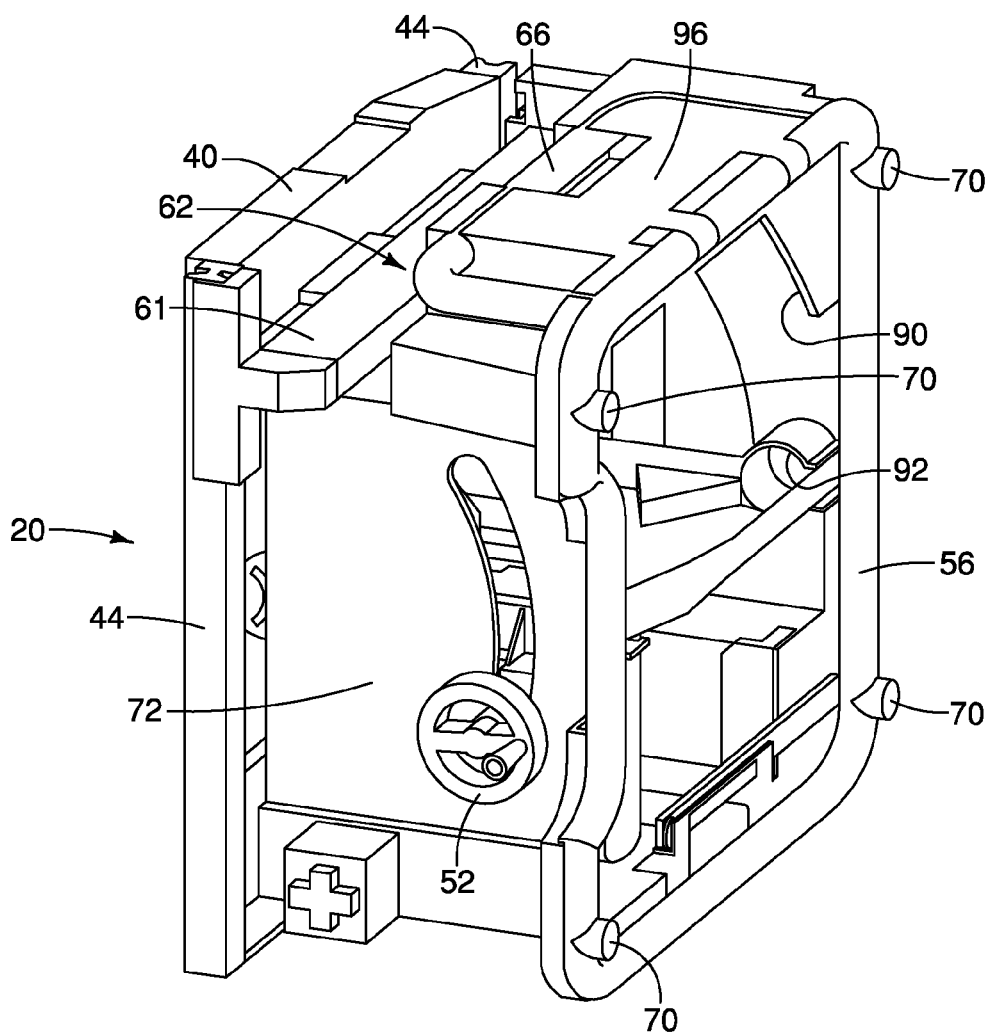
FIG. 9 is a perspective view of the portable table saw shown in FIG. 1, illustrating the table saw standing on its left side so that a user can grab the handle on the frame to carry the table saw.

A handle, indicated generally at 62, is attached to the sub-frame 56 preferably on the right sight of the table saw 20. The handle 62 may also be connected to the sub-frame 56 on the left side or any other suitable side of the table saw 20. The handle 62 is preferably formed by a single hollow tube similar to the tubes forming the sub-frame 56 where the handle includes two spaced apart ends or posts 64 that are transverse to the sub-frame. A grip member 66 is connected the ends of the posts 64 as shown in FIG. 2. The handle 62 is preferably integrally formed with the sub-frame 56 and is spaced a designated distance above the sub-frame. When the sub-frame 56 is connected to the table saw 20, the handle 62 extends upwardly along the right side of the table saw and is held in position by clamp members 68. As shown in FIG. 9, the handle 62, and more specifically, the grip member 66 is positioned at or near the center of gravity of the table saw 20 to balance the weight of the table saw to make carrying the table saw easier and less cumbersome. Preferably, the grip member 66 is made of a one-inch diameter tubing but it is contemplated that the tubing may be any suitable size.

In this regard, the sub-frame 56 and the handle 62 are preferably made of a durable, light-weight metal, such as steel or aluminum, that makes the table saw easier to lift and carry and that can withstand the wear and tear that occurs during the transportation of the table saw 20 from location to location. It should be appreciated that any suitable metals such as stainless steel, composite materials such as a durable plastic, or combinations of materials can be used to make the sub-frame 56 and handle 62.

A plurality of bottom supports or support feet 70 are attached near the corners of the sub-frame 56 to provide support and stability to the table saw 20. As shown in FIG. 2, the bottom supports 70 have a generally cylindrical shape and are secured to the table saw 20 by screws, bolts or other suitable fasteners or fastening methods. Preferably, the bottom supports 70 are made of a durable, shock-absorbing, non-slip material such as rubber but may be made of any suitable material or combination of materials. The bottom supports 70 have a designated height to provide space between the table saw 20 and an underlying support surface (i.e., the ground or a workbench) so that that sub-frame 56 does not bump or scrape the ground or underlying surface during the transportation and operation the table saw. The bottom supports 70 also help to minimize vibration and incidental movement of the table saw 20 during operation.

As shown in FIG. 9, a user can rotate the table saw 20 and stand it on one of its sides, i.e., the side opposite to the handle, so that it can be carried by a user to another location or jobsite. The user then grabs the grip member 66 of the handle 62 and lifts the table saw 20 to carry it between locations. Because the grip member 66 is positioned to be at or near the center of gravity of the table saw 20, the weight of the table saw is substantially balanced about the handle to make carrying the table saw easier. The generally centered position of the grip member 66 relative to the table saw also allows both left-handed and right-handed people to be able to carry the table saw. To enhance a user's grip of the handle 62, the tube forming the grip member 66 is sized to fit comfortably in the user's hand. Once the user reaches their desired location or jobsite, the user flips the table saw 20 over so that the sub-frame 56 sits on an underlying support surface such as a table, the ground or other surface.

To aid in transporting the table saw between locations and jobsites, it is desirable to make the table saw 20 as lightweight as possible. It is also desirable for the table saw 20 to be durable and sturdy to withstand the wear and tear placed on it. The table saw 20 therefore includes generally z-shaped, opposing vertical front and rear side panels 72, 74 that are made of metal, such as steel or aluminum, that provide durability and structural support for the table saw.

Referring to FIGS. 3, 7 and 8, the front metal side panel 72 attached to the front side of the table saw 20 is generally planar with upper and lower spaced-apart transverse mounting portions 76, 78 extending from the panel. The upper mounting portions 76 are located at each end of the upper edge of the front side panel 72 and are attached to the bosses 48 extending from the table top 26 by inserting screws, bolts or other suitable fasteners through holes 80 and into the bosses. The lower mounting portions 78 extend from the opposing ends of the lower edge of the side panels 72, 74 and also define one or more holes 80 for receiving a fastener to secure the side panels to the sub-frame 56. As shown in FIG. 8, the upper and lower mounting portions 76, 78 do not extend the full length of the upper and lower edges of the side panels 72, 74 so as to reduce the amount of material used to form the metal side panels and thereby reduce the overall weight of the table saw 20. It should be appreciated that the front and rear side panels 72, 74 may be any suitable length and also may be a single mounting portion that extends the length of the side panels. The front side panel 72 is preferably made of metal such as steel or aluminum which is durable and light-weight. Other suitable metals such as stainless steel, materials or combination of materials may also be used. To accommodate the blade adjustment control 52, the front metal side panel 72 defines an elongated crescent-shaped opening 82 as shown in FIGS. 1 and 8.

The rear metal side panel 74 is generally planar and is attached to the rear side of the table saw 20 using upper and lower transverse mounting portions 84, 86 defining fastening holes 88. Specifically, the upper and lower transverse mounting portions 84, 86 are respectively connected to the bosses 48 extending from the table top 26 and also to the sub-frame 56 using suitable fasteners. The rear side panel 74 defines a crescent-shaped opening 90 to accommodate vacuum/exhaust equipment such as an exhaust vent 92. The front and rear metal side panels 72, 74 are interconnected between the table top 26 and the sub-frame 56 to provide structural support to the table saw 20. To further enhance the structural stability and durability of the metal side panels 72, 74, one or more ribs 94 may be attached to the side panels by welding or other suitable attachment methods.

Weight is a factor in the portability of the table saw 20. To minimize the weight of the table saw and also to reduce material cost, only the front and rear side panels 72, 74 are made of metal. The right and left side panels 96, 98 of the table saw are made of a composite material, such as plastic, which is lighter than metal and can be formed to any desired shape or conform to the surfaces on the sides of the table saw. This helps to reduce the overall weight of the table saw. The opposing composite side panels 96. 98 are formed separately and are mounted to the table saw such as by molding or attached using suitable fasteners. As shown in FIGS. 1 and 3-6, the right and left composite side panels 96, 98 cover a portion of the right and left sides of the table saw and extend partially around to the front and rear sides to provide further structural stability.

To minimize vibration during operation of the table saw, one or more shock absorbers 100 have a ring-like structure and are placed on the fasteners that secure the front and rear side panels 72, 74 to bosses 48 extending from the table top 26 so that the shock absorbers are between the bosses and the upper transverse mounting portions 76, 84 of the front and rear side panels. Alternatively, the shock absorbers 100 are secured between one or more of the front and rear side panels 72, 74 and the table top 26. The shock absorbers 100 may be made of rubber, plastic or any suitable shock absorbing type material.

The combination of the metal side panels 72, 74 and the lighter weight composite side panels 96, 98 enhances the durability of the table saw 20 during transportation in the field while minimizing the overall weight of the saw to make it easier for a user to carry it between job sites.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A portable table saw comprising:
   a table top on a first side having a generally rectangular top surface with front, rear and opposing side surfaces and having a slot through which a saw blade can extend, said table top having an outer periphery;
   a tubular sub-frame for supporting the table saw on a second side, said sub-frame having a outer periphery generally coextensive with the outer periphery of said table top, wherein said second side opposes said first side;
   a handle connected to said sub-frame, said handle extending transversely from said sub-frame and positioned at a center of gravity of the table saw for providing weight balance when carrying the table saw;
   at least one clamp member configured to receive said handle and secure said handle in position, said at least one clamp member defining a space for enabling a user to grab said handle;
   front and rear vertical metal panels having upper and lower transverse mounting portions interconnecting said sub-frame and said table top;
   left and right vertical side panels made of a composite material mounted on said sub-frame and extending generally between said front and rear metal panels.

2. The portable table saw as defined in claim 1 wherein said handle is adjacent to and spaced from one of said side panels for allowing hand clearance to grab the handle.

3. The portable table saw as defined in claim 1 wherein said handle is integrally formed with said sub-frame.

4. The portable table saw as defined in claim 1 wherein said handle is formed by at least one hollow tube.

5. The portable table saw as defined in claim 1 wherein said sub-frame and said handle are made of one of steel and aluminum.

6. The portable table saw as defined in claim 1 wherein said handle includes two spaced apart posts extending transversely from said sub-frame and a grip member interconnecting said posts, said grip member being positioned at the center of gravity of the table saw.

\* \* \* \* \*